Nov. 21, 1939.  L. T. ELIEL ET AL  2,180,406
METHOD AND APPARATUS FOR ASSEMBLING MAPS
Filed Feb. 9, 1937  3 Sheets-Sheet 1
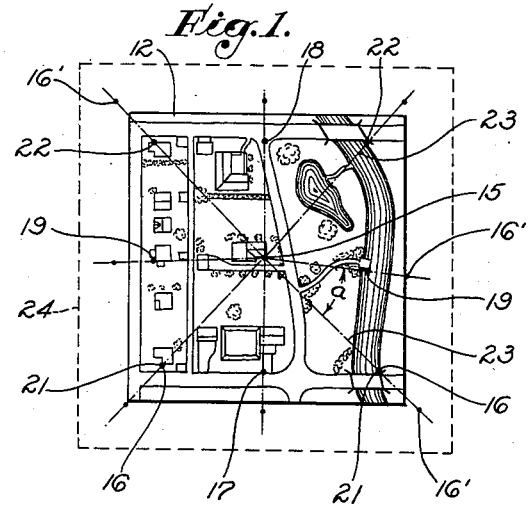
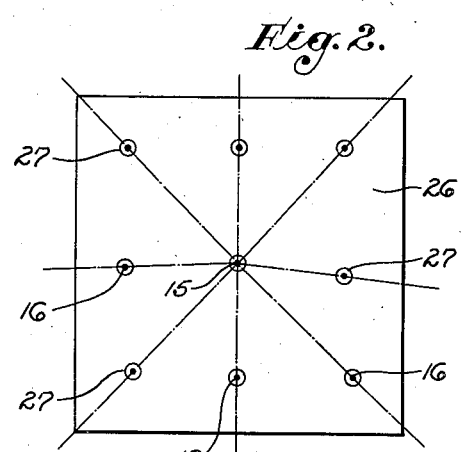
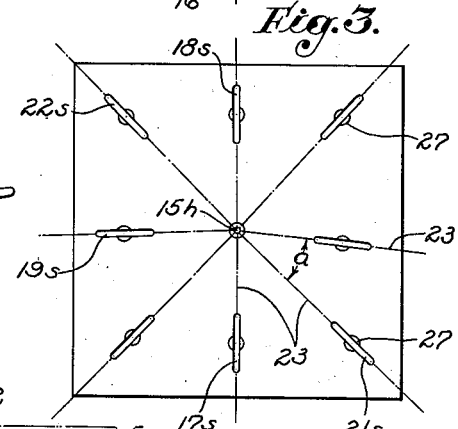
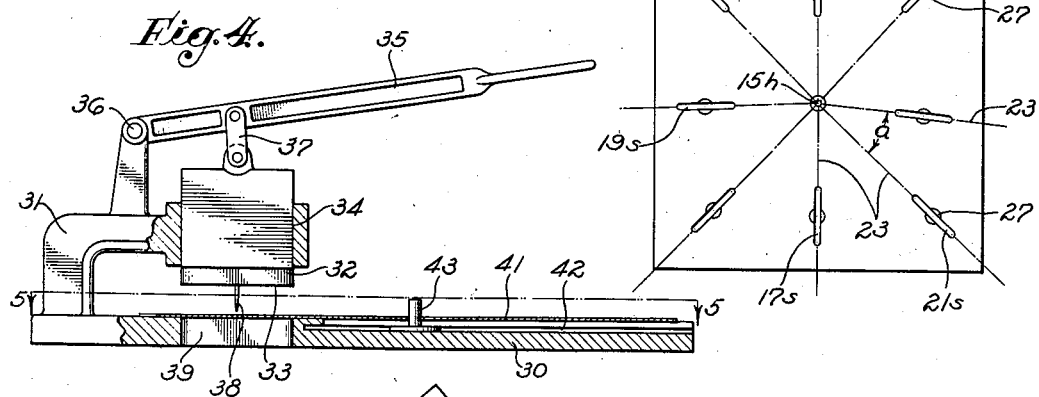
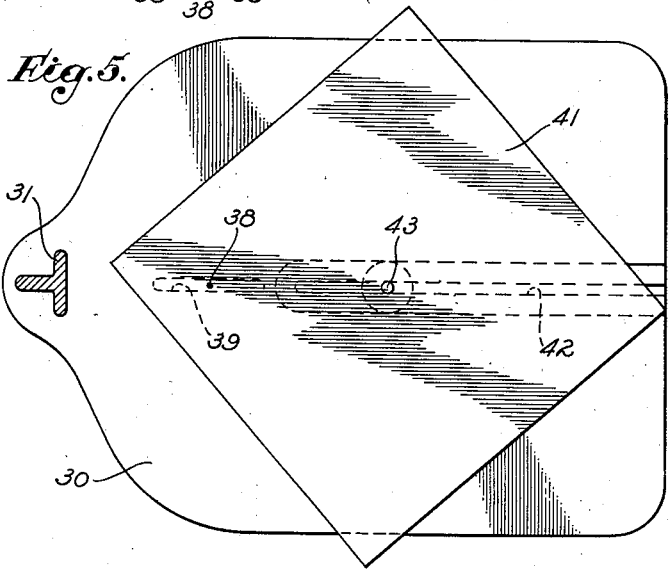
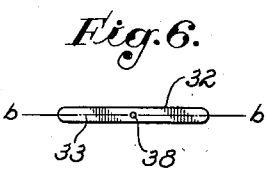
INVENTORS
LEON T. ELIEL
EDWARD R. POLLEY
MAXWELL A. PHILLIPS
BY HARRIS, KIECH, FOSTER & HARRIS
ATTORNEYS.

Nov. 21, 1939.    L. T. ELIEL ET AL    2,180,406
METHOD AND APPARATUS FOR ASSEMBLING MAPS
Filed Feb. 9, 1937    3 Sheets-Sheet 2
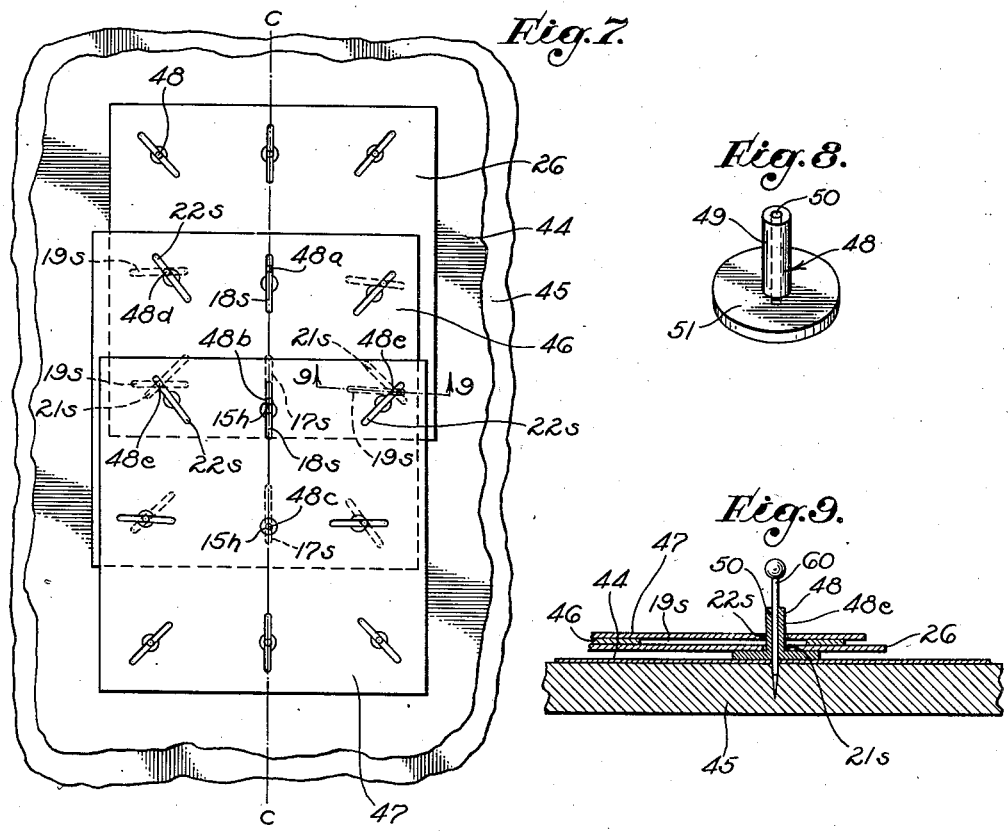
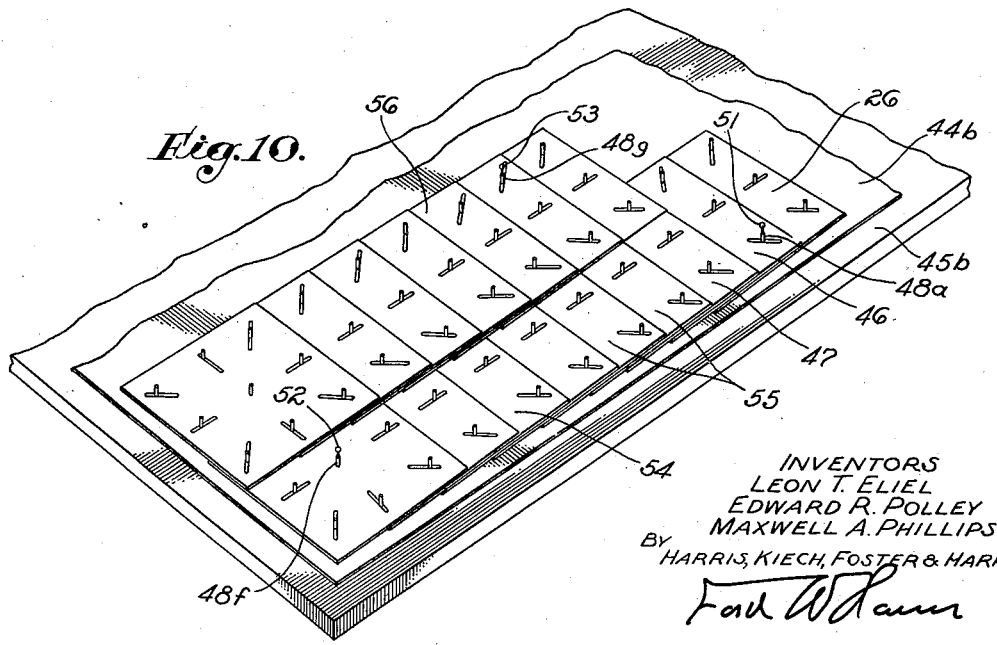
INVENTORS
LEON T. ELIEL
EDWARD R. POLLEY
MAXWELL A. PHILLIPS
BY HARRIS, KIECH, FOSTER & HARRIS
ATTORNEYS.

Nov. 21, 1939. L. T. ELIEL ET AL 2,180,406

METHOD AND APPARATUS FOR ASSEMBLING MAPS

Filed Feb. 9, 1937 3 Sheets-Sheet 3

INVENTORS
LEON T. ELIEL
EDWARD R. POLLEY
MAXWELL A. PHILLIPS
BY HARRIS, KIECH, FOSTER & HARRIS

ATTORNEYS.

UNITED STATES PATENT OFFICE 2,180,406

METHOD AND APPARATUS FOR ASSEMBLING MAPS

Leon T. Eliel, Pasadena, and Edward R. Polley and Maxwell A. Phillips, Los Angeles, Calif., assignors to Fairchild, Polley & Eliel, Inc., Los Angeles, Calif., a corporation of California Application February 9, 1937, Serial No. 124,882

9 Claims. (Cl. 33—1)

Our invention relates to improvements in the method and means for assembling or producing maps from aerial photographs by use of templets provided with mechanical means for determining their relative positions, as disclosed in the Collier Patent No. 2,102,612, issued December 21, 1937, entitled "Method and apparatus for making maps".

In the method of map making referred to in the foregoing paragraph, templets representative of map areas are provided which have mechanical means for establishing a center point, radial lines, and central angles. By use of such mechanical guide means the templets are assembled on a supporting member such as a table. An object of our present invention is to provide means whereby definite points, such as center points and the points of intersection of the radial lines of the templets, may be quickly and accurately transferred to a member providing a flat surface on which photographs corresponding to the templets are to be mounted in complementary positions, or on which a planimetric or other type of map is to be developed.

In the preferred practice of the method above referred to, the templets are provided with mechanical guide means in the form of holes and slots, the center point of each templet being represented by a hole and the radial lines which pass through outlying or wing points being represented by slots. It is an object of our present invention to provide a simple and practical means for punching the templets, such means including a punching device for accurately forming the slots in desired cooperating relation to a center point and an outlying or wing point.

In the general practice of the slotted templet method where an assembly of templets is either uncontrolled or has insufficient control in the form of fixed points spaced apart in accordance with known measurements, there is a tendency for the templets to crawl away from true positions, and where the control points are relatively far apart, there may be a deviation from true scale at a location intermediate the control points. It is sometimes difficult to obtain a series or assembly of control points sufficiently close together to maintain a desired scale throughout an entire assembly of templets, as, for instance, in flat jungle country, there may be few elevated points of suitable intervisibility, and visibility might be poor on account of haze and steam, thereby making it difficult to obtain a suitable number of control points by triangulation, while traverse work would be very inexpedient due to difficulties in getting over the country. While the foregoing example is an extreme condition, it is invariably true that the establishing of a suitable control by ground survey is costly, and it is therefore desirable to reduce the amount of this work to a minimum. It is an object of our present invention to provide means whereby a suitable control may be established with a minimum of ground survey expense, and whereby a control may be established under circumstances which inhibit the practical obtaining of a desired number of control points owing to the character of the the country which is to be mapped. These improvements include the azimuth defining means and the floating anchor hereinafter to be described in detail and which have utility not only in the slotted templet method of map making, but in the ordinary practice of aerial mapping which is known as the radial control method and wherein transparent templets having radial lines inscribed thereon are assembled on a mounting member. Heretofore, in the art of producing maps from aerial photographs, and particularly in the practice of the Collier patent, it has been considered necessary to make the overlapping templets of transparent material to permit visual checking through the templet. At the same time, it has been well recognized that several important disadvantages inhere in the employment of transparent material, disadvantages to which those skilled in the art have become reconciled as unavoidable.

Some of these disadvantages reside in the transparency itself of the templets. For example, the templets are marked variously with notations of control points and other identifying and correlating data, and, inaccuracies arise from confusing marks under a templet with the marks made on the templet surface, especially when several operators cooperate on a layout.

Other disadvantages spring from certain seriously objectionable physical characteristics found in practice to be inseparable from transparency. Glass is too thick, too fragile, and, for our purpose, impractical because of the difficulty of forming slots in plates of finished glass. Celluloid, as representative of all flexible material that may be readily punched, has a relatively high coefficient of thermal expansion that may be fatal to accuracy in map delineation. The tendency of Celluloid and like materials to distortion offers further problems, particularly the tendency to warp and curl, since accuracy requires that the templets lie perfectly flat over periods of time.

We have further noted that often a significant cumulative error in a series of interlocked Celluloid templets may be traced to local lateral deformation engendered by stresses at the slots.

A further disadvantage is that transparent materials are much more expensive than other sheet material such as heavy paper or cardboard.

Contrary to the prevailing practice and to the past trend of the art, we have discovered that opaque material may be substituted for transparent material, and that such substitution not only avoids the disadvantages associated with the physical characteristics of transparent materials, but also provides a templet that will effectively mask reference data on underlying templets or on the surface supporting the templets.

It is an object of our invention, then, to minimize errors arising from confusion of indices by employing opaque templets.

Further objects and advantages of the invention will be made evident throughout the following part of the specification.

Referring to the drawings, which are for illustrative purposes only.

Fig. 1 is a view showing an aerial photograph such as taken by an aerial mapping camera.

Fig. 2 shows a templet in the process of preparation.

Fig. 3 is a view showing a templet after it has been punched and slotted.

Fig. 4 is a partly sectioned elevational view showing our templet slotting device with a templet thereon in position for slotting.

Fig. 5 is a sectional plan view taken as indicated by the line 5—5 of Fig. 4.

Fig. 6 is a bottom plan view of the punch or cutter employed in the device shown in Fig. 4.

Fig. 7 is a view showing a number of templets arranged on a mounting board.

Fig. 8 is a perspective view of a conjoining post forming a part of the invention.

Fig. 9 is an enlarged fragmentary sectional view taken as indicated by the line 9—9 of Fig. 7, to indicate the manner in which points established by the conjoining posts are transferred to a reference paper and also to the mounting board.

Fig. 10 is a fragmentary perspective view showing a mounting board having control points established thereon, and showing the manner in which adjacent rows of consecutive templets are assembled upon the board.

Figure 11:
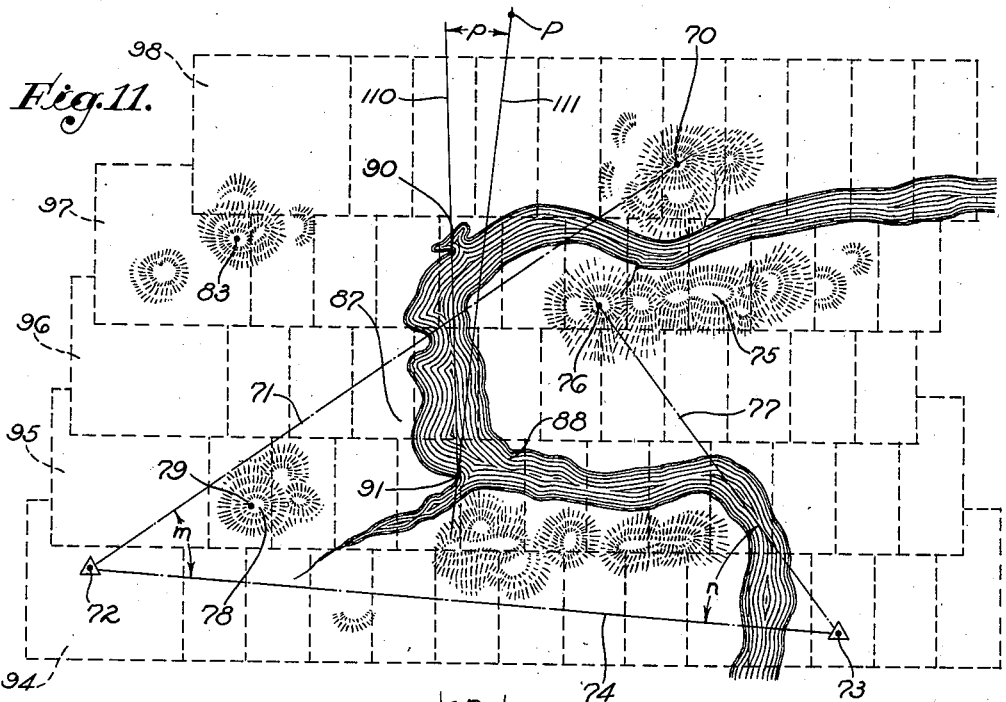
Fig. 11 is a view of a portion of a terrain having inaccessible portions so that control points cannot be easily established therein by survey.

In Fig. 1 we show a photograph 12, such as produced by an aerial camera. The picture or image shown in this photograph 12 may be referred to as a map area, since it constitutes an area of a map or may be employed in conjunction with other map areas to produce a mosaic or line map. The photograph 12 may be enlarged or reduced, but it will continue to be an image of the same area of the ground or terrain, and therefore throughout the operation of the map making process wherein the photograph may be enlarged or reduced in accordance with scale requirements, it may be constantly referred to as the map area.

In some practice of making maps by use of the the aerial method, an airplane carrying a camera is flown back and forth along adjacent parallel lines over the terrain to be photographed, and consecutve photographs are taken of the terrain in such overlapping relation that one photograph will overlap the preceding photograph more than fifty per cent, and preferably sixty per cent. The camera is provided with means for establishing or marking the center point on each photograph. In the map making process the center point 15 is established, and then a number of outlying center points 16 are marked on the photograph at clearly recognizable points therein, eight or more of such outlying center points 16 being ordinarily employed. These outlying center points 16 are preferably pricked on the photograph by means of a prick punch. Two of the outlying points 16, respectively indicated at 17 and 18, are disposed to the front and to the rear of the principal center point 15 and may be respectively referred to as the forward secondary center point and the rearward secondary center point, generally being the principal center points of the adjacent pictures. On opposite sides of the principal center point 15, lateral wing points 19 are located, and on opposite sides of the points 17 and 18, forward wing points and rearward wing points 21 and 22 are respectively located, as clearly shown in Fig. 1.

If radial lines 23 are passed through each of the outlying points 16 and the principal center point 15, these radial lines will define central angles $a$. Should the photograph 12 be now placed in an enlarging camera the lens of which is centralized with the principal center point 15, and an enlargement of the photograph made, such as indicated by dotted lines 24, every eccentric point or part around the principal center point 15 of the image presented by the photograph 12 will move radially outwardly. For example, the outlying center points 16 will all move to the positions or points 16'. The central angles $a$ will remain unchanged, and the outlying points 16' of the enlargement 24 will continue to lie on the lines 23, and therefore the outlying points 16' of the enlargement 24 will continue to define the central angles $a$. Therefore, the central angles $a$ and the positions of the radial lines 23 around the principal center point 15 are characteristic of the map area presented by the photograph 12, the enlargement 24 thereof, or any other enlargement or reduction thereof. Likewise, these identical characteristics will be found in any photograph taken of the area disclosed in Fig. 1 and having the same center point 15.

As shown in Fig. 2, a templet 26, preferably a sheet of material having a low coefficient of expansion and being strong enough to withstand considerable tension, such for example, as heavy paper, cardboard, or metal, is inscribed with the center point 15 and the outlying points 16 corresponding in position to these points on the photograph 12. To definitely establish the positions of these points on the templet 26, small circles 27 are drawn around the same. As shown in Fig. 3, a small center hole 15$h$ is punched concentric with the point 15 appearing upon the templet 26. Then, central slots 17$s$ and 18$s$, lateral slots 19$s$, forward wing slots 21$s$, and rearward wing slots 22$s$ are respectively punched in positions extending radially with respect to the central hole 15$h$ and in centralized relation to the points 17, 18, 19, 21, and 22 and the radial lines represented thereby.

The slots have a width corresponding to the diameter of the opening 15$h$, and since the positions of these slots are determined by the positions of the outlying points 16, they definitely establish the radial lines 23 and the central angles a which are characteristic of the map area 12. The templet 26, being representative of the characteristics of the map area presented by the photograph 12, may be placed on the photograph 12 or upon any enlargement or reduction thereof, and it will be found that when the central opening 15h is caused to coincide with the center point 15 of the photograph, the outlying points 16 of the photograph will lie somewhere along the longitudinal center lines of the slots of the templet provided, of course, that the length of the slots has been amply provided for. The templet 26 is accordingly of composite or multiple scale, since its prescribed limitations are the center point and the central angles defining the positions of the radial lines 23, and when assembled on a mounting board to establish the positions for the subsequent placing of photographs, multiple scale templets of the character above described compensate for the differences in scale of the photographs which have been taken from an airplane.

In Figs. 4 and 5 we show the simple device which we have produced for forming the slots in the templets in positions radial to the center point and centralized with relation to the outlying points. This device has a flat table 30 provided with a support 31 for a slotting cutter or punch 32 having its lower or cutting face 33 elongated along an axis b—b, as shown in Fig. 6 which is an end view of the punch. By guide walls 34 the punch 32 is guided so that it may move vertically, and actuating means are provided in the form of a handle 35 which is pivoted at 36 and is connected to the upper end of the punch by means of a link 37. The punch 32 has a centralizing pin 38 projecting downwardly from the center of the face 33 thereof, although there might be cases when the picture scale varies considerably from the mapping scale when the pin 38 would be constructed eccentrically along the line b—b; and the lower portion of the punch 32 is adapted to pass into a die or opening 39 formed in the base 30 so that a slot will be punched in a templet, such as the templet 41, placed on the base 30. The base 30 has guide means for aligning the center point of the templet with the axis b—b of the punch 32. This guide means includes a slot 42 in the upper face of the base 30, aligned with the axis b—b of the cutter 32, and a post 43 slidably carried in the slot so that it may be toward or away from the cutter 32.

In the operation of slotting a templet, such templet, as indicated at 41 in Figs. 4 and 5, is placed with the center hole 15h thereof over the post 43, and the templet and the post 43 are then moved until an outlying point 16 of the templet is concentric with the point of the guide pin 38. The handle 35 of the device is then actuated downwardly to force the punch 32 through the templet, thereby forming a slot therein which will be centralized relatively to the outlying points 16 and will likewise be radially directed with respect to the central opening 15h. After templets have been prepared from photographs of an area to be mapped, these templets are then assembled upon a mounting board, and the central openings 15h and the slots in the templets are employed in cooperation to properly position the templets as they are assembled. In Fig. 7 the templet 26 is shown on a sheet of paper 44 which is secured to a mounting board 45. Under some conditions intermediate paper 44 is preferably omitted, but for descriptive purposes it is included in this specification. In overlapping relation templets 46 and 47 are also shown on the paper 44, these templets 46 and 47 being representative of consecutive map areas or photographs. The templets 26, 46, and 47 are connected together by means of conjoining posts 48, each of which, as shown in Fig. 8, comprises a stem 49 having a diameter corresponding to the diameter of the hole 15h of each of the templets and to the width dimensions of the slots of the templets. Each conjoining post has a wall or flange 51 projecting radially from the lower end of it, and a guide opening 50 is extended vertically through each post, as shown in Figs. 8 and 9. Each post, indicated at 48a, 48b, or 48c, passes through the center opening 15h of a templet 26, 46, or 47 respectively, and each of the pins or posts 48a, 48b, and 48c passes also through either a forward slot 17s, a rearward slot 18s, or both, of an adjoining templet or templets. For example, the post 48a passes through the rearward slot 18s of the templet 46; the post 48b passes through the forward slot 17s of the templet 26, then upwardly through the central opening 15h of the templet 46, and finally through the rearward slot 18s of the templet 47. The post 48c passes upwardly through the forward slot 17s of the templet 46 and then through the central opening 15h of the templet 47. A post 48 is projected upwardly through each lateral wing slot 19s of each templet 26, 46, and 47. Such a post, as indicated at 48d in Fig. 7, will pass through a lateral wing slot 19s and also through a rearward wing slot 22s, the slots 19s and 22s being respectively in the templets 26 and 46. The post indicated specifically as 48e passes through the forward wing slot 21s of the templet 26, through the lateral wing slot 19s of the templet 46, and through the rearward wing slot 22s of the templet 47. It will be understood that the row of templets started by the three templets 26, 46, and 47, of Fig. 7, may be continued by the placing of consecutive templets in overlapping relation, and it will be further understood that wherever three templets overlap, as upon the line 9—9 of Fig. 7 or as shown in Fig. 9, a post 48 will pass through the three overlapping portions of such templets, and the position of the post will indicate the point of intersection of the center lines of the crossing slots through which the post 48 projects.

Should any two of the templets shown in Fig. 7 be moved relatively together or apart along the line c—c of Fig. 7, the remaining templet must be proportionately moved, and likewise the posts 48 indicated specifically as 48a, 48b, and 48c will be moved proportionately. For example, should the templets 26 and 47 be moved relatively apart, the change in the position of the slots 21s and 22s through which the post indicated at 48e is projected will cause movement of the post 48e laterally outwardly in proportion to the movement of the templets 26 and 47.

In assembling a group of templets on a mounting board, it is customary to establish upon the mounting board certain control points which have been determined by ground survey. For example, as shown in Fig. 1, reference pins 51, 52, and 53 are driven into the mounting board 45b on which a reference paper 44b has been placed, the pins passing through the paper 44b and forming small holes therein indicating their positions. These pins 51, 52, and 53 are spaced apart in accordance with the desired scale to which the map is to be assembled. A strip 54 of templets 26, 46, and 47, and additional templets 55, is assembled upon the reference paper 44b. Conjoining posts 48a and 48f are placed on the reference pins 51 and 52, the result being that the positions of the pins 51 and 52 will definitely determine the spacing or positions of the posts 48a and 48f which pass through proper openings in the templets of the strip 54. A second strip of templets, as indicated at 56, may be assembled and placed along the side of the strip 54 in overlapping relation to the edge of the strip 54, as shown, this overlap being preferably thirty per cent. The proper post 48g will be engaged by the reference pin 53, thereby determining the position of the post 48g relative to the posts 48a and 48f. The assembly of templets upon the mounting board 45b may be continued by the formation of adjacent strips and the use of additional control points determining the positions of reference pins, as clearly described relative to Fig. 10.

After the desired assembly of templets is made upon the paper 44b, the positions of the various central and outlying points of the templets may be readily transferred to the paper 44b and the mounting board 45b by passing a pin, such as a marking pin 60 shown in Fig. 9, through the openings 50 in selected posts 48, these pins being driven or forced down so that they will pass through the paper and enter into the surface of the board 45b sufficiently to clearly mark the same. Thereafter, the reference paper 44b may be employed for determination of distances between the various points, which information may be employed in the preparation of positive photographs, and the mounting board 45b may be subsequently used as a base upon which to mount the photographs so as to form a mosaic map, or the control net on the reference paper 44b or the board 45b may be used to assemble a line map, or in various other ways.

In preparation for the taking of photographs from which a map is to be made, it is sometimes necessary to make a ground survey for the purpose of establishing a sufficient number of control points for use in compiling the maps. All control points are identified on the photographs. In conducting such ground survey, a number of triangulation or control stations are set up, and it is sometimes found that an important point, such as a mountain peak, may be visible from one control station and not visible from some other station. Also, it is found that certain areas to be photographed may be inaccessible so that a number of control points cannot easily be established with relation to or at known distances from the triangulation stations or main control points. Illustrative of this, we have in Fig. 11 shown a view of a terrain including a prominence 70 which, as indicated by the dotted line 71, is visible from a triangulation station 72 from which a second triangulation station 73 may be sighted, as indicated by the dotted line 74. Owing to the presence of a range of hills 75, the point 70 cannot be seen from the triangulation station 73. Likewise, the point 76, which, as indicated by dotted lines 77 may be seen from the station 73, cannot be seen from the station 72 owing to the presence of a peak 78.

Figure 12:
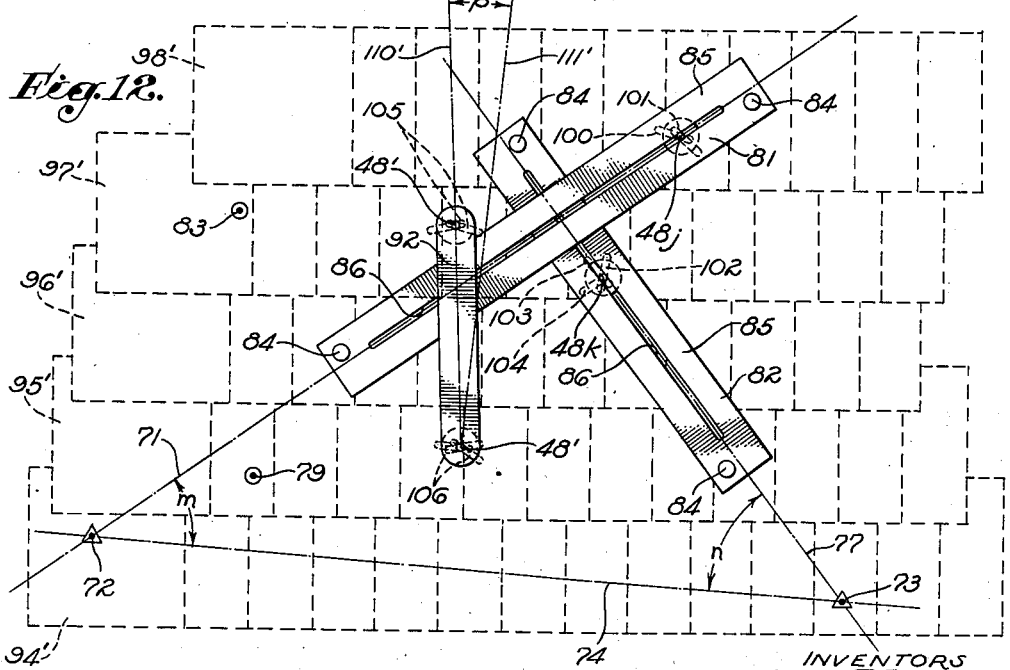
Fig. 12 is a view of a portion of a mounting board showing the manner of using azimuth guides and a floating anchor.
Figure 13:
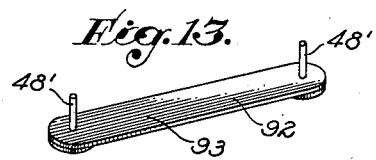
Fig. 13 is a perspective view of a floating anchor.

It will be noted that the distance of either of the points 70 or 76 from the triangulation stations 72 and 73 is not known. However, relative to the base line 74 between the stations 72 and 73, the azimuth angles m and n are obtained so that it is therefore known that the point 70 will lie somewhere along the azimuth line 71 and that the point 76 will lie somewhere along the azimuth line 77. To make use of this information, we employ mechanical azimuth defining means 81 and 82 such as shown in Fig. 12. The mounting board is laid off with the known points thereon, for example, the triangulation stations 72 and 73, the point 79 of the peak 78, the point 83, etc. From the base line 74 the azimuth lines 71 and 77 are then turned off to the proper azimuth angles m and n relative to the base line 74, and the members 81 and 82 are secured to the mounting board by means of tacks 84 in positions determined by the azimuths 71 and 77. The azimuth defining means 81 and 82 each consist of a sheet of material 85 having a slot 86 therein of substantially the same width as the slots employed in the templets. The members 81 and 82 are placed so that the slots 86 thereof will be centralized on the azimuth lines 71 and 77. Conjoining posts 48j and 48k are placed in the slots 86 and can be moved due to the restraining effect of the slots only along the azimuth lines 71 and 77. The area 87 lying between the points 79 and 76 and between the points 73 and 83 may be inaccessible for purpose of survey to establish control points therein, except along the banks of a river 88 which flows through such territory. The area 87 may be of such character that no definitely distinguishable point therein may be observed from either of the triangulation stations 72 or 73, and it is therefore impossible to establish the distance of any control points within this area from any of the other known points. It may be possible, however, to determine the distance between points 90 and 91, which lie along the bank of the river 88, without knowledge of the distance of either of these points from an established control point. The distance between the points 90 and 91 may, however, be advantageously employed in the assembling of templets and photographs to make a map by the employment of a floating anchor 92, which, as shown in Fig. 13, comprises a strip of sheet material 93 having a pair of upstanding posts 48' secured near the ends thereof and being spaced apart a distance corresponding to the known dimension between the points 90 and 91. As previously described herein, the templets of an assembly of templets tend to creep from their proper positions owing to the clearances between the conjoining posts and the holes and slots in the templets, this creeping becoming more noticeable as the distance of the templets from a fixed or control point increases. Therefore, where there is a considerable distance between two established control points, accuracy may be contributed to by holding two intermediate points to a known spacing even through the distance of those intermediate points from the control points is not known. The floating anchor 92 serves this purpose. As indicated in dotted lines in Fig. 11, flights are carried across the area, and photographs are taken in strips 94, 95, 96, 97, and 98, in accordance with the practice hereinbefore discussed. Each of the points in the area shown in Fig. 11 will appear on two or more photographs. Therefore, the images of the points 70, 72, 73, 75, 79, 83, 90, and 91 will appear in the series of photographs which have been taken, and their positions may be established and indicated on templets by holes and slots. If any one of the above noted points should fall upon a center point of a photograph, it would be indicated by a hole, but if any of these points is eccentric to the center point of the photograph, it must be represented by a slot, and likewise all of the above noted points will be represented by at least a hole and a slot, or two or more slots. After templets 94', 95', 96', 97', and 98' are prepared from the photographs, they will be assembled upon the mounting board as indicated in dotted lines in Fig. 12. Slots 100 and 101, which are representative of the point 70, will be placed over the conjoining post 48j, and therefore the point 70 will be established in the assembly of templets somewhere along the azimuth line 71. Likewise, slots 102, 103, and 104 in other of the templets, representing the point 76, will be passed over the conjoining post 48k, definitely establishing the point 76 somewhere along the azimuth line 77. Owing to the co-engagement of the openings and slots in the templets between the posts 48j and 48k, the distance between the posts 48j and 48k will now be very close to the true scale dimension between the posts 70 and 76. We have found that the use of azimuth and azimuth guides 81 and 82 will very materially assist in maintaining control, this being especially so where several azimuths are employed which are disposed substantially perpendicular to each other and have reference to points relatively close together. Likewise, in the assembly of the templets shown in Fig. 12, the posts 48' of the floating anchor are passed upwardly through slots 105 and 106 representing the points 90 and 91 in the assembly of templets, thereby tying the templets together at a point between other points of control and thereby maintaining in an intermediate zone a desired scale relation between points which are definitely tied together but which are of floating character when considered with relation to the control points 72 and 73, since up to this time the distance from the points 90 and 91 to the points 72 and 73 is not known; but after the assembly of elements, namely, the templets, azimuth guides, and the floating anchor, in Fig. 12, the distances between these parts may now be determined with reasonable accuracy. The principle of the azimuth line and floating anchor may also be successfully employed visually using the old transparent templet method.

An additional important feature of our invention is to position the points 90 and 91, Fig. 11, by determining the azimuth of a line defined by these points relative to a known point or direction, such, for example, as Polaris. As shown in Fig. 11, a line 110 may be sighted from the point 91 through the point 90, and the azimuth angle $p$ of the line 110 may be determined relative to a line 111 which is sighted from the point 91 to Polaris P. Then, in the assembly of templets as shown in Fig. 12, the posts 48' of the floating anchor 92 may be caused to lie upon a line 110', or, in other words, define a line 110' which is at an angle $p$ relative to the Polaris face or reference line 111'.

An additional valuable feature of our invention relates to a method and means whereby the accuracy of the assembly of templets may be determined or checked. Frequently, specifications are written wherein the permissible magnitude of "triangles of error" is defined. In the practice of our invention duplicate transparent templets are prepared of occasional test area sections having slots and holes identical with slots and holes of the non-transparent templets and representing the same image points. From the photographs which these transparent templets represent, additional image points are indicated by the inscribing of radial lines thereon. These transparent templets are then assembled over the same posts as the non-transparent templets so that the positions of all of the auxiliary or additional image points which are indicated by the radial lines will appear as intersections of radial lines, provided the assembly of templets is perfect. Any imperfection in the assembly of templets becomes apparent by the appearance of "triangles of error", or, in other words, the formation of small triangles by the crossing radial lines instead of the radial lines all intersecting at the same point. Where the above method is employed, no undetected errors can creep into the assembly of templets, and a precise determination may be made of the magnitude of such inaccuracies as do exist.

In our new procedure involving the employment of opaque templets, we may mark a control surface liberally with reference data without any concern for subsequent confusion. We may then correlate the interlocking templet assembly with selected indicia on the control surface, doing so with complete freedom to mark the templets with indicia as desired without risk of confusion, since only the uppermost notations are visible.

Since we have demonstrated that it is not only permissible but desirable to employ opaque materials, the art may now take advantage of various desirable physical properties found in the whole range of opaque sheet material. Thus, heavy paper or cardboard may be used because such materials are substantially free from thermal expansion, are exceptionally inexpensive, and present surfaces especially adapted for marking indicia and other data. We have found cardboard to be quite suitable, but we may resort to sheet metal for its strength and resistance to deformation at the slots of the templets.

The details of our disclosure may be widely varied without departing from the spirit of our invention, and we specifically reserve the right to all such departures that come within the scope of our appended claims.

We claim as our invention:

1. A templet representative of a map area having radial slots therein defining the central angles of said map area, and conjoining means adapted to be passed through said slots to adjustably connect said templet to adjoining templets of similar character, said conjoining means having centralized guides, and marking means guided by said guides and being adapted to be moved into marking engagement with a surface on which a record of the positions of said conjoining means is to be made.

2. A method of establishing control in the making of maps from aerial photographs taken of a terrain, by use of templets having center points and radial lines defining outlying points, comprising: establishing a plurality of control points; determining the azimuth of another point on said terrain; preparing a surface member on which to assemble templets, by locating said control points thereon and also locating thereon the azimuth of said other points; forming a set of templets representing the map areas of said terrain; and assembling said set of templets on said surface member so that the indications of said control points thereon will coincide with said control points located on said surface member and so that the representation of said other point on said templets will lie on said azimuth located on said surface member.

3. A method of establishing control in the making of maps from aerial photographs taken of a terrain, by use of templets having center points and radial lines defining outlying points, comprising: establishing a plurality of control points; determining the azimuth of another point on said terrain; forming a set of templets representing the map areas of said terrain; and assembling said set of templets so that the indications of said control points thereon will coincide with said control points and so that the representation of said other point on said templets will lie on said azimuth.

4. A method of establishing control in the making of maps from aerial photographs taken of a terrain, by use of templets having center points and radial lines defining outlying points, comprising: establishing a plurality of control points representative of points on said terrain; establishing the distance between a floating point and another point on said terrain; preparing a set of templets representing the map areas of said terrain; assembling said templets so that the indications of said control points on said templets will correspond to the proper positions of said control points in a map; and maintaining the indications of said floating point and said other point on said templets spaced apart in accordance with said distance.

5. A method of establishing control in the making of maps from aerial photographs taken of a terrain, by use of templets having center points and radial lines defining outlying points, comprising: establishing a plurality of control points representative of points on said terrain; establishing the distance between a floating point and another point on said terrain; determining an azimuth of a line defined by said floating point and said other point; preparing a set of templets representing the map areas of said terrain; assembling said templets so that the indications of said control points on said templets will correspond to the proper positions of said control points in a map; and maintaining the indications of said floating point and said other point on said templets spaced apart in accordance with said distance and on an azimuth line positioned in accordance with said azimuth.

6. In the mapping art, means for locating a point on a map surface, including: two templets having slots representing lines through said point, each of said slots being symmetrical with respect to the line it represents, said templets being in overlapping relation with said slots intersecting each other; and a post slidingly mounted on said map surface and extending through both said templets at the intersection of said slots, said post being cylindrical and of a diameter substantially equal to the width of said slots whereby the edges of both the slots will be tangential to the post and confine the post to positions with the axis of the post at the intersection of the two lines represented by the slots, so that the axis of the post will be at the correct location for said point on said surface when said templets are correctly positioned on the surface, said post having an axial aperture to receive means for indicating the position of the post axis on said surface.

7. In the mapping art, means for locating a point on a map surface, including: two templets having slots representing lines through said point, each of said slots being symmetrical with respect to the line it represents, said templets being in overlapping relation with said slots intersecting each other; a post slidingly mounted on said map surface and extending through both said templets at the intersection of said slots, said post being cylindrical and of a diameter substantially equal to the width of said slots whereby the edges of both the slots will be tangential to the post and confine the post to positions with the axis of the post at the intersection of the two lines represented by the slots, so that the axis of the post will be at the correct location for said point on said surface when said templets are correctly positioned on the surface, said post having an axial bore; and a pin adapted to extend through said bore to indicate the position of the post on said surface.

8. In the mapping art, means for locating points of unknown location data of a terrain on a miniature surface representative of that terrain, said means including: a plurality of overlapping templets on said surface representative of corresponding overlapping portions of said terrain, said templets having central apertures and radial slots through points corresponding to said points of unknown location data; a plurality of means slidingly mounted on said surface in engagement with some of said apertures and slots to interlock said templets, thereby forming an expansile series of templets, at least some of said sliding means representing said points of unknown location data; a plurality of means representing points of known location data of said terrain, said means being fixedly anchored on said surface at points thereof corresponding to said known points, said latter plurality of means engaging said series of templets at points thereon corresponding to said known points; a means slidingly mounted on said surface representative of a point on the terrain of known azimuth from one of said points of known data and engaging said series of templets at a point corresponding to said terrain point; and a guide on said surface in sliding engagement with said last-named means to confine said means to said azimuth.

9. In the mapping art, means for locating points of unknown location data of a terrain on a miniature surface representative of that terrain at a given scale, the distance between two of said points being known, said means including: a plurality of overlapping templets on said surface representative of corresponding overlapping portions of said terrain, said templets having central apertures and radial slots through points corresponding to said points of unknown location data; a plurality of means slidingly mounted on said surface in engagement with some of said apertures and slots to interlock said templets, thereby forming an expansile series of templets, at least some of said sliding means representing said points of unknown location data, including said two points of known distance of separation; and a floating link movably mounted on said surface and interconnecting said means representative of said points of known distance of separation and holding said means at spacing corresponding to said given scale.

LEON T. ELIEL.
EDWARD R. POLLEY.
MAXWELL A. PHILLIPS.